United States Patent [19]

Salem et al.

[11] Patent Number: 5,192,446

[45] Date of Patent: Mar. 9, 1993

[54] CATION EXCHANGE RESINS HAVING AN ENHANCED CAPACITY FOR IRON OXIDES

[75] Inventors: Eli Salem, Deal; Robert Kunin, Trenton, both of N.J.

[73] Assignee: The Graver Company, Union, N.J.

[21] Appl. No.: 824,998

[22] Filed: Jan. 24, 1992

[51] Int. Cl.$^5$ ................................................ C02F 1/42
[52] U.S. Cl. ................................. 210/685; 210/686; 210/688; 210/777
[58] Field of Search ................. 210/685, 686, 688, 777

[56] References Cited

U.S. PATENT DOCUMENTS

| | | | |
|---|---|---|---|
| 2,597,438 | 5/1952 | Bodamer | 260/79.3 |
| 4,256,840 | 3/1981 | Meitzner et al. | 521/29 |
| 4,973,607 | 11/1990 | Stahlbush et al. | 521/28 |
| 4,975,201 | 12/1990 | Ma | 210/686 |

OTHER PUBLICATIONS

R. Kunin, "Ion Exchange Resins," pp. 46–47, 98–99(1958).
Liu et al., "Hope Creek Deep Bed Filtration Pilot Testing," Paper Delivered at Electric Power Reaearch Institute Conference, pp. 6–7 (Sep. 1991).
T. Izumi et al., "Crud Removal Characteristics of Newly Developed Ion Exchange Resins," Proceedings of 52nd Annual Meeting of the International Water Conference, Paper No. IWC-91-57 (Oct. 1991).
R. Kunin, "Two Decades of Macroreticular Ion Exchange Resins," Published Article Appearing in Amber-Hi-Lites Issue 161, Spring, 1979.
T. Izumi et al., "Crud Removal Characteristics of Newly Developed Ion Exchange Resins,"]Proceedings of 50th Anniversary Meeting of the International Water Conference, Paper No. IWC-89-52 (Oct. 1989).
I. Inami et al., "Mechanism of Crud Removal By Deep Bed Resins," Proceedings of 50th Anniversary Meeting of the International Water Conference, Paper No. IWC-89-51 (Oct. 1989).
R. Bijeo, "Dowex ® Resins-BWR Condensate Polishing," Paper Delivered at Electric Power Research Institute Conference (Jan. 1991).
Sales Literature, "Dowex Marathon C Cation Resin," Believed to Have Been Distributed by the Dow Chemical Company Circa 1991.
Sales Literature "Diaion ® Manual of Ion Exchange Resins" Believed to Have Been Distributed by The Mitsubishi Kasei Corporation Circa 1991, vol. I, pages 108–110, and vol. II, pages 101 and 104.

*Primary Examiner*—Ivars Cintins
*Attorney, Agent, or Firm*—Dressler, Goldsmith, Shore, Sutker & Milanmow

[57] ABSTRACT

The invention provides a method for removing transition metal oxides and soluble cation species from condensate at a relatively high removal efficiency. The method includes hydrating a strongly acidic dual morphology cation exchange resin in a macroeticular, desiccated morphology to produce a macroreticular, hydrated morphology. Condensate which is brought into contact with the resin when it is in a hydrogen form is purified. The condensate may, optionally, also be contacted with an anion exchange resin.

The invention additionally provides a method for selecting cation exchange resins which are particularly suited for use in removing metal oxides from a condensate stream. The method serves to narrow the field of condidates for pilot-scale resin testing with industrial condensate.

15 Claims, 3 Drawing Sheets

O RESIN A
■ RESIN B
△ RESIN C

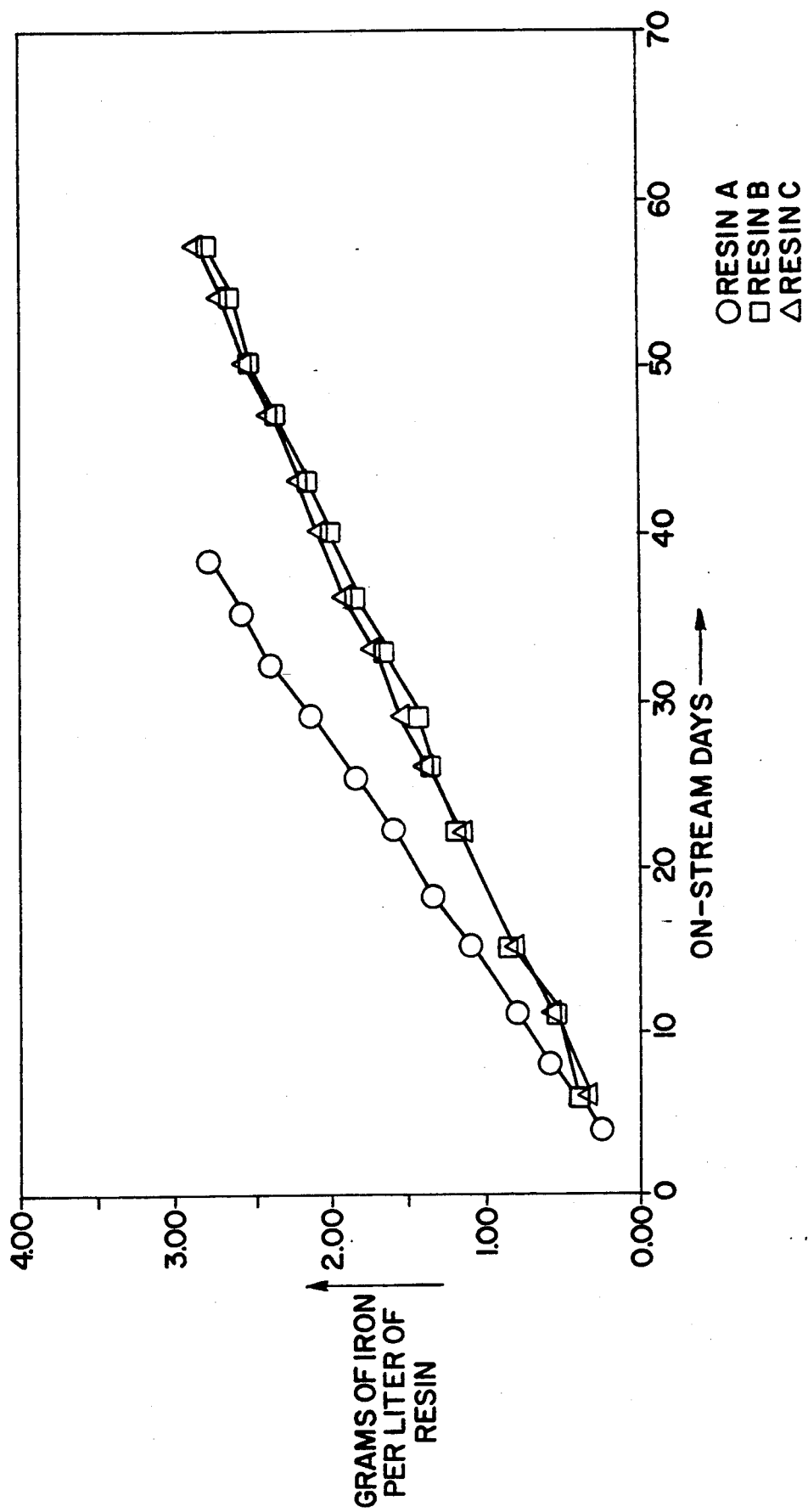

CATION EXCHANGE RESINS HAVING AN ENHANCED CAPACITY FOR IRON OXIDES

TECHNICAL FIELD

The invention relates to the purification of steam generation system condensate and, more particularly, the removal of transition metal oxides from condensate in a condensate polishing unit. The invention also pertains to the selection of cation exchange resins for removing iron and copper oxides from condensate.

BACKGROUND OF THE INVENTION

Cation exchange resins are widely used for removing ionic species and particulates from water streams. A typical resin includes a copolymer, such as a styrene-divinylbenzene copolymer, to which sulfonic acid anionic sites have been attached by a sulfonation reaction.

Useful cation exchange resins contain essentially no leachable compounds, organic or inorganic, that might leave the resin and contaminate the water stream. Additionally, the cation exchange resin must possess sufficient hydraulic stability to resist compressive forces exerted by a flowing stream of water and substantially maintain its shape.

In order to provide such useful cation exchange resins, resin designers have adjusted hydration, swelling, and porosity of cation exchange resins through proper choice of polymers and copolymers and through control of the degree of cross-linking of polymer chains. Additionally, resins having pores with dimensions significantly larger than the molecular distance between adjacent copolymer chains have been synthesized by the inclusion of various uncrosslinked polymers in the monomer mixture which are rendered soluble and leachable following sulfonation. The leachable polymers are removed, leaving relatively large-sized pores throughout the cation exchange resin. Other macroreticular resins have been synthesized by polymerizing a resin in a solvent which dissolves monomer reagents but exerts essentially no solvent action on the copolymer produced.

Cation exchange resins have been used to purify many different types of water streams, ranging from household drinking water to industrial waste. With the development of modern high-pressure steam generation systems, cation exchange resins are currently employed to treat boiler feedwater makeup streams and recycle condensate water streams. Condensate polishing units containing cation exchange resins are used to remove impurities, such as iron oxide corrosion products, from condensate streams produced in chemical manufacturing processes and in electrical power generating plants, both fossil-fueled and nuclear-powered.

Condensate polishing units containing cation exchange resins are the norm for modern steam generation systems operating at 2000 psig. or more. The use of condensate polishing units leads to improved turbine efficiency, shorter unit startup time, protection from the effects of condenser leakage, and longer intervals between acid cleanings. The cation exchange resins may be present in relatively deep beds or in coatings on filters.

The use of cation exchange resins to purify condensate streams in boiling water reactor (BWR) nuclear reactors is illustrative. In a BWR system, water is circulated through a nuclear reactor core producing saturated steam which is directed to a steam turbine generator and, thereafter, passed to a condensate polishing unit. The steam itself is not radioactive, although impurities in the steam, such as iron oxide and copper oxide particulate, may be converted to radioactive isotopes. As in fossil-fired power plants, improved turbine efficiency and protection from an accumulation of deposits in the steam system are important considerations. Consequently, cation exchange resins are employed in condensate polishing units to remove metal oxide particles which are often present in BWR condensate in the range of about several parts per billion by weight. Cation exchange resins have been developed specifically for this application. These cation exchange resins remove the insoluble iron and copper oxides by means of adsorption and filtration.

More recently, it has been noted that some of the ion exchange resins used for purifying nuclear BWR condensate streams demonstrate better iron removal efficiency after several months of service. Experts theorize that a fraction of the divinylbenzene linkages, which cross-link styrene polymer chains in the resins, yield to oxidative attack during service. The resins with a reduced degree of cross-linking appear to remove iron from condensate more efficiently. Accordingly, cation exchange resins were developed which contain a relatively low degree of divinylbenzene cross-linking between styrene polymer chains. The cation exchange resins with relatively low degree of cross-linking have been tested in at least one condensate polishing unit serving a nuclear BWR reactor and increased iron removal efficiency has been reported.

However, the testing of new cation exchange resins on a relatively large pilot plant scale is both expensive and time-consuming. Many types of conventional ion exchange resins are available to steam system operators for removing iron oxides from condensates. From the myriad of products available, steam system operators attempt to select ion exchange resins that can be used to safeguard and improve steam system performance.

Unfortunately, few guide lines exist for selecting an ion exchange resin capable of removing iron oxides from condensate to the very low levels required for boiler feed water in high-pressure steam systems. Selecting a resin by trial and error is a task of elephantine proportions, since there are no known methods for performing such studies in the laboratory. Further, there are no known methods for preparing simulated condensates containing iron oxides having the correct chemical and physical properties for bench-scale laboratory testing. At the current state of the art, tests must be conducted on a relatively large pilot plant scale, usually on the site of an industrial operation.

Although conventional ion exchange resins have proven useful for condensate polishing in the past, a need exists for a cation exchange resin having an enhanced capacity for iron oxides, especially in a mixed bed mode of operation. A desirable resin would demonstrate removal efficiencies of 90% or more and produce a product stream that contained only a few parts per billion by weight of iron oxides, in conformance with limits set by the nuclear BWR industry. An ideal cation exchange resin would have a very high specific surface area in order to adsorb as much iron as possible. Also, the rate of diffusion of ferric and ferrous irons into the resin structure would be high so that surface ion exchange sites would remain in an active hydrogen form, allowing uninterrupted adsorption and dissolution of the iron oxides.

SUMMARY OF THE INVENTION

The present invention provides a method for removing metal oxide contaminants from a condensate stream with improved removal efficiency. The method utilizes a cation exchange resin in which rates of adsorption, dissolution, and diffusion of metal oxide impurities have been coordinated to produce a relatively high overall rate of metal oxide removal.

Additionally, the invention provides a method of selecting cation exchange resins which are particularly suitable for use in purifying condensate streams. The method does not require large-scale pilot plant testing on industrial condensate streams.

In one aspect, the invention is a method for removing transition metal oxides, such as the oxides of iron and copper, from condensate. The method will also remove soluble cationic species from the condensate, if they are present. The method includes hydrating a strongly acidic, dual morphology cation exchange resin which is in a microreticular, desiccated morphology. A change which occurs simultaneously with hydration converts the dual morphology cation exchange resin to a macroreticular, hydrated morphology.

An aqueous stream containing condensate is passed into a separation zone that includes a first particulate bed. The first particulate bed is composed of the dual morphology cation exchange resin. The aqueous stream is contacted with the resin, while it is in hydrogen form. A first concentration of a transition metal oxide in the aqueous stream is reduced by contact with the resin.

The method may optionally include contacting the aqueous stream with an anion exchange resin. The anion exchange resin may be present as a constituent of the first particulate bed or, alternatively, may be present as a second particulate bed.

In another form, the invention is a method for selecting an ion exchange resin that is especially suitable for removing iron oxides from condensate. In order to select such a resin, particles of a sulfonic acid cation exchange resin which is being considered as a candidate for industrial use are provided for testing. It is determined whether the particles are opaque, translucent, or transparent while they are in a dry state. It is also determined whether the particles are opaque, translucent, or transparent while in a hydrated state. Only particles which are translucent or transparent in the dry state and opaque in the hydrated state are selected for use in removing iron oxides from condensate. Visual examination of the particles by the naked eye or by microscope, is usually sufficient to determine whether the particles are opaque, translucent or transparent. It is preferred that the determination be accomplished while the resin is in hydrogen form.

The physico-chemical structure of the unique cation exchange resins may be defined by a combination of total moisture holding capacity and surface area. For the purpose of this invention, the limits consistent with the unique products having the enhanced capacity for the iron oxides are as follows:

Total Moisture Holding Capacity, % wt.—45 to 65%
Surface Area, $m^2/g$—7 to 60

The present invention also provides a method of removing an amorphous iron oxide from condensate. The amorphous iron oxide, present as a suspended particulate, or as a colloid, is adsorbed on a strong acid cation exchange resin. The resin has a resin matrix composed of polymer chains and copolymer cross-linkages which is surrounded by an adsorbent surface. The amorphous and microcrystalline iron oxide adsorbs on the adsorbent surface and dissociates into ferric and ferrous ions at the surface. These soluble ionic species diffuse into the resin matrix, thus becoming effectively isolated and removed from the condensate stream. The resin is gelular or microreticular in a dry state and substantially macroreticular in a hydrated state and may be present in a powdered form or in a bead form. The resin may be disposed as a layer on an upstream side of a filter or as a deep bed.

BRIEF DESCRIPTION OF THE DRAWINGS

FIG. 3 is a graph depicting the resin loading, expressed in grams of iron per liter of resin, exhibited by three ion exchange resins as a function of onstream days for each resin.

DETAILED DESCRIPTION OF THE PREFERRED EMBODIMENTS

Figure 1:
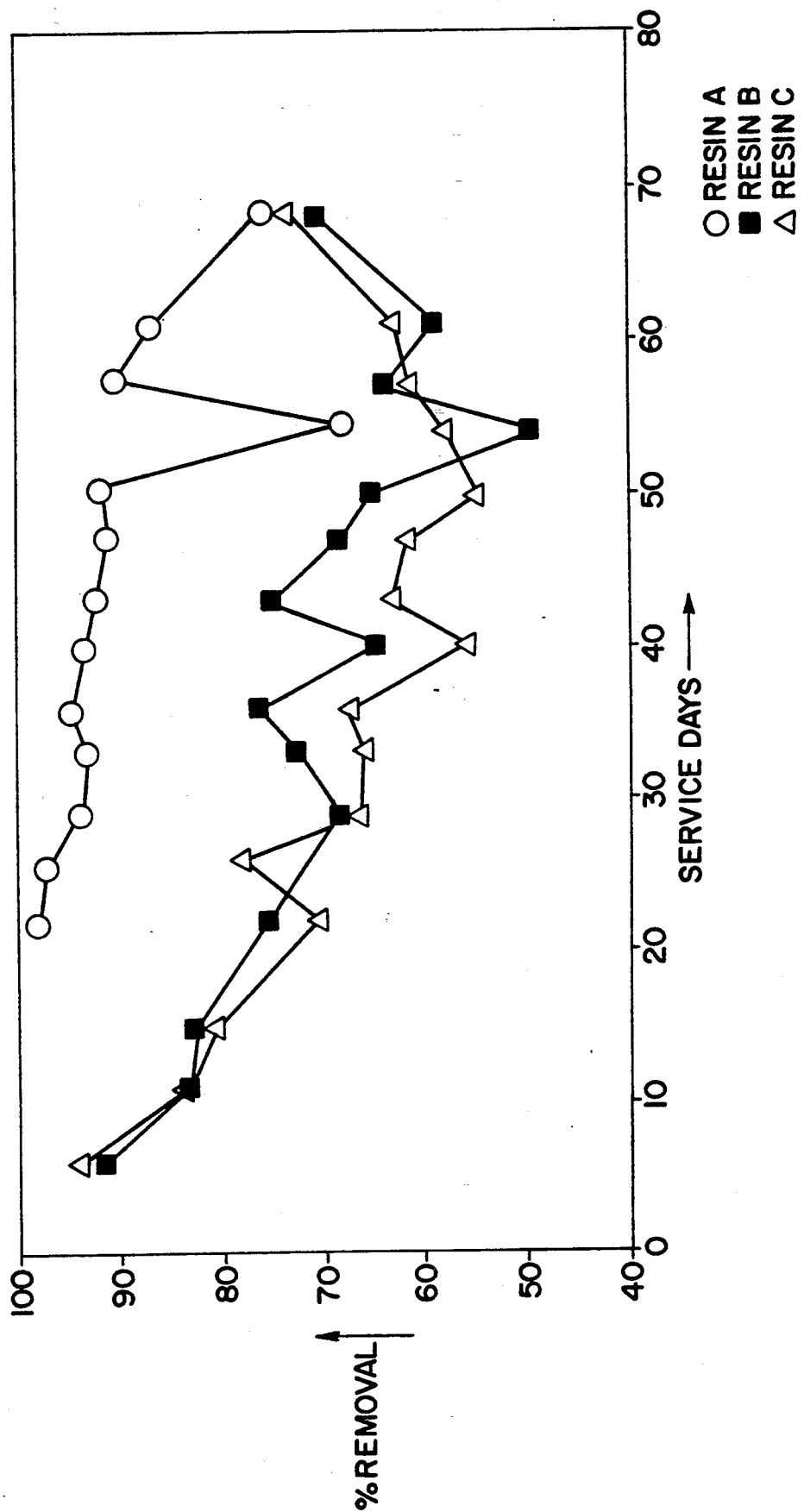
FIG. 1 is a graph illustrating the iron particulate removal efficiency exhibited by three different ion exchange resins as a function of pilot plant days in service.

The modern trend in steam generation systems is toward increasing operating pressures and less blowdown. In steam systems operating at about 2000 psig. or more, it becomes prohibitively expensive to replace blowdown with an equal volume of boiler feed water treated to the rigorous standards required for high-pressure boiler operation. Furthermore, above about 3200 psig. the water in the steam system exists in a single super-critical phase. With no liquid phase present, impurities are not concentrated for efficient separation and blowdown. Accordingly, in modern high-pressure steam systems a practice of treating condensate streams, called condensate polishing, is the primary means of removing corrosion products from the steam system.

A steam system for which the present invention is intended usually comprises a turbine where energy is extracted from a stream of hot high-pressure steam, a condenser where steam exiting the turbine is cooled to produce a condensate stream, and condensate pumps which transport the condensate stream for reuse. The condensate stream may be stored temporarily before reuse and may be augmented with treated boiler feed water makeup, as necessary, to replace water which has been lost by the steam system.

The condensate stream, along with a relatively minor amount of makeup water, as necessary, is contacted with one or more ion exchange resins in a condensate polishing unit. The polishing unit may be a deep bed demineralizer having resin in the form of beads arranged in beds typically from about 36 to about 48 inches in depth. The resin may be utilized in powder form as a layer on the upstream side of a filter element through which the condensate passes. The resin may be discarded after use or regenerated. Regeneration may be accomplished within the condensate polishing unit, or in external regeneration facilities.

After polishing, feed pumps transport the condensate stream through preheaters to a steam generation zone. In the steam generation zone, energy is added to the condensate stream in the form of heat. The heat may be generated by the combustion of fossil fuel, by nuclear reaction, or as a byproduct of an industrial process.

The steam generation zone usually contains ferrous tubing and sometimes contains copper alloy tubing. It may contain a boiler drum where a liquid phase is separated from a gaseous phase. The steam generation zone may optionally be of a drumless design, especially for operation at supercritical pressures. The steam generation zone may include a chemical or a nuclear reactor. Vaporous or supercritical steam so generated by the addition of heat leaves the steam generation section and passes to a turbine where energy is extracted.

Throughout most of the steam system, water is in contact with tubes, vessel walls, or valves made of ferrous or cuprous alloys. Some corrosion of the alloys is inevitable, even when the most meticulous operating procedures are employed. If the products of such corrosion were allowed to remain within the steam system, serious damage would result. For example, iron-containing corrosion products are known to form on the inside of tubes in high heat transfer areas, causing boiler tube failures. The acid cleaning procedure necessary to remove such deposits is expensive and time-consuming. Similarly, iron-containing corrosion products accumulate on turbine blades, where they can cause significant losses in turbine efficiency, imbalance of the turbine blades, and eventual shutdown of the turbine.

To avoid deposition and accumulation of iron-containing deposits, iron levels in the boiler feed water of high-pressure steam systems must be kept extremely low. Typical recommended limits for iron in boiler feed water expressed as parts per billion by weight (ppb) are a maximum of 50 ppb for steam systems operating at 600 psig. or more, and a maximum of 10 ppb for systems at 1000 psig. or more. Current specifications for BWR systems are 2 ppb (maximum).

The most common iron-containing corrosion products are iron oxides. The iron oxides include $Fe_2O_3$, $Fe_3O_4$, and FeOOH. They may be present in either crystalline or amorphous form. The major crystalline types encountered in boiler feed water are $Fe_3O_4$ $\alpha$-$Fe_2O_3$, $\alpha$-FeOOH, and gamma-FeOOH. The iron-containing corrosion products generally dissociate when the water suspending them is acidified to a sufficiently low pH. However, during operation, most high-pressure boilers are controlled at a pH of 8.5 or more, and the corrosion products are present primarily as electronically neutral compounds.

In addition to the iron-containing corrosion products, other contaminants are often found in boiler feed water. Even in well maintained super-critical boilers, silica and oxygen are present in the range of several parts per billion. Additionally, most steam systems contain ammonia which has been added to maintain the boiler feed water in an alkaline range. Copper, silica, chloride, and organic compounds may also be present.

There are several reasons why the most suitable resins cannot be identified by laboratory tests of the prior art. First, the sulfonic acid cation exchange resins, which are prime candidates for this service, are virtually all of the sulfonated styrene-divinylbenzene type. Sulfonated styrene-divinylbenzene resins undergo changes in chemical and physical properties when converted from a dry state to a hydrated state by contact with water. Because the resins are immersed in water during normal operation, the change will necessarily have occurred by the time the resin is brought onstream in a condensate polishing unit. The most readily apparent of these changes is an increase in volume accompanied by a decrease in apparent bulk density. This change is often described as a swelling of the resin upon contact with water.

While the resin is swelling, other changes also take place. Effective pore diameters often increase as water is absorbed into the resin particles. Specific surface area available for adsorption may also change.

The changes observed upon hydration correlate to some extent with the degree of cross-linking present in a particular resin. Styrene chains are connected, to a greater or lesser degree, by divinylbenzene linkages which are reflected in the physical properties of the resin. However, the degree of cross-linking is not directly measurable. Rather, it usually must be inferred from other properties, such as the equilibrium water content of the resin and the degree of swelling observed upon contact with water. As a result, one who attempts to predict other physical properties from the degree of cross-linking enters a vicious circle.

The degree of cross-linking cannot be calculated from relative proportions of reagents used to prepare the resin, because the reagents are not pure and rarely completely characterized. Furthermore, the efficiencies of the various cross-linking reactions which occur are unpredictable. Consequently, correlations which predict the performance of condensate polishing resins based on their degree of cross-linking alone are generally unsuccessful.

The accepted methods for measuring specific surface area of a resin can only be performed when the resin is completely dry and maintained in a carefully controlled atmosphere. Dry surface area is not a reliable indicator of condensate polishing performance. Because many gel cation exchange resins lose surface area when they are dried, the usual methods for measuring surface area have comparatively little value for characterizing condensate polishing resins. Condensate polishing performance is intimately tied to the wet surface area of the hydrated cation exchange resin, which cannot be measured directly.

Neither the degree of cross-linking nor the wet surface area of a particular resin can be determined directly. Qualitatively, however, it is believed that the degree of cross-linking for a condensate polishing cation exchange resin should be low while the wet surface area should be maximized. Ordinary gel-type cation exchange resins, which are usually associated with a low degree of cross-linking, generally exhibit desirably high rates of diffusion into the resin matrix. But a more discerning indicator is required than the distinction between gelular and macroreticular resins because most gel-type cation exchange resins possess relatively low surface area and, accordingly, exhibit low rates of adsorption. In short, the traditionally recited characteristics of degree of cross-linking and dry surface area are inadequate to identify the sulfonic acid cation exchange resins which are most useful for condensate polishing.

In place of the difficult-to-measure, inexact, and relatively unreliable indicators utilized in the prior art, a property termed "dual morphology" is offered as a superior means of distinguishing cation exchange resins which are particularly suited for use in condensate polishing. A resin is said to exhibit dual morphology when it can be reversibly converted from a dry, gelular morphology to a macroreticular, hydrated morphology by contact with water.

A resin displaying gelular morphology, predominantly contains gel-type pores which are of a molecular nature and are a part of the gel structure. The gel-type pores are less than 30 Å in diameter. In conventional prior art resins, gel-type pores were generally synthesized by a method which did not include the use of an inert, co-solvent. A synonym for gelular is microreticular.

Macroreticular morphology contains a significant proportion of extra-gelular pores that are not a part of the gel structure. The pores of resins having macroreticular morphology are generally greater than 30 Å in diameter. The pores are large compared to atomic dimensions of an associated resin matrix which defines the pores.

The invention provides a method for removing transition metal oxides and cationic species from condensate. The transition metals are those elements found in groups 3b, 4b, 5b, 7b, 8, 1b, and 2b of the Periodic Table of the Elements as depicted on the inside back cover of the 51st Edition of the Handbook of Chemistry and Physics, published by The Chemical Rubber Company. The invention is particularly useful for removing the elements having atomic numbers in the range from 21 to 30 and 42, which are commonly employed in ferrous piping systems. Iron, cobalt, and nickel oxides can be removed using the present invention, whether they are present in suspended, colloidal, or dissolved form. Similarly, crystalline amorphous and dissociated transition metal oxides can be removed from condensate by the present invention. Removal efficiencies of greater than 90% are practical. The invention can produce condensate having less than 50 ppb of total dissolved solids.

Because the invention utilizes a cationic exchange resin for removing transition metal oxides, other soluble cationic species, such as calcium, magnesium, and sodium will also be removed by the method if they are present in the condensate. However, there are many cationic exchange resins in the prior art which satisfactorily remove such commonly encountered soluble cationic species. The present invention is primarily intended for further improving the quality of condensate streams from which such easily exchanged soluble cationic species have previously been substantially removed.

The present invention will also remove organic species that may be dissolved or entrained in the condensate stream. Such organic materials may have entered during construction or maintenance of the boiler system or perhaps through a leaking seal of a boiler feedwater pump. In many applications, the present invention used in conjunction with an anion exchanger will reduce the total organic content of condensate streams to a fraction of a part per million by weight or less.

The invention utilizes a strongly acidic dual morphology, cation exchange resin to remove transition metal oxides. The strong acid cation resins, such as sulfonic resins, are about as acidic as hydrochloric acid. In contrast, weak acid cation resins, such as carboxylic resins, are about as weakly acidic as acetic acid. Strong acid cation exchange resins easily split neutral salts, such as sodium chloride, converting them to acids. Weakly acidic cation exchange resins are unable to split neutral salts.

The cation exchange resin employed in the invention has a dual morphology. By definition, such a resin can be reversibly converted from a microreticular morphology to a macroreticular morphology by contact with water. By contacting the resin in a dry state with water, the dual morphology resin becomes hydrated.

Before any characterization of an ion exchange resin can be performed, the resin must be pretreated. Otherwise, the results obtained may be misleading. In order to pretreat a sample of ion exchange resin preparatory to characterization, the sample is placed in a 2 inch diameter column and backwashed at 100% bed expansion until a clear backwash effluent is observed. The resin bed is then permitted to settle. In the case of sulfonic acid and quaternary ammonium anion exchange resins, the bed is next treated with 5 to 10 volumes of a 10% NaCl solution and then rinsed with deionized water. Weak base resins are regenerated with 3 to 5 volumes of 1.0M NaOH solution and then rinsed with deionized water. Carboxylic resins are treated with 3 to 5 volumes of 1.0M HCl solution and rinsed with deionized water. In each case, the sample is thereafter drained to remove free water. For a more detailed description of the resin pretreatment procedure, see R. Kunin, on Ion Exchange Resins, 320 to 321 (2nd Edition, 1958).

The moisture content of resins, also called equilibrium water content, is determined after the resin pretreatment procedure has been accomplished. A 1.0 to 5.0 gram sample is weighed and then dried in an oven at 110° to 115° C. overnight. Subsequently, the sample is weighed again. The moisture content is the difference in weights is expressed as a percentage of the dry weight of the sample.

For the purposes of the present invention, a desiccated morphology is defined as a physical condition in which a resin exists when it contains 5% or less equilibrium water content. A hydrated morphology is defined as a condition in which a resin exists when it contains 95% or more of equilibrium water content. Generally, when a styrene-divinylbenzene resin is dried it shrinks. When placed in water, it swells and its polymer chains and divinylbenzene crosslinkages spread apart and facilitate the diffusion of larger ions. The degree of swelling depends to some extent on the degree of cross linking. The greater the number of crosslinks, the less the moisture holding capacity and the swelling.

The method comprises a hydrating step in which the strongly acidic dual morphology cation exchange resin is converted from a microreticular desiccated morphology to a macroreticular hydrated morphology. In most instances, resins are shipped in the hydrated state. However, there are times when the resins are shipped dry or in a less than fully hydrated state. For example, a portion of resin beads packed within a drum containing an aqueous phase may be exposed and become dessicated as contents of the drum shift during shipment. It is contemplated that the hydrating step will be fully completed at the industrial facility where the resin is utilized for purifying condensate. However, the scope of the invention includes hydrating the strongly acidic dual morphology cation exchange resin during a manufacturing process and delivering the resin to a point of industrial use in the macroreticular hydrated morphology.

The invention also comprises passing the condensate containing the transition metal oxide into a separation zone and contacting the condensate with a first particulate bed. The condensate may be passed as a separate stream or it may be part of an aqueous stream containing water from other sources as well. The aqueous stream may contain, for example, boiler feedwater makeup and condensate from temporary storage, along with condensate passed directly from a condenser in a steam system.

In the aqueous stream, the transition metal oxide is carried as a dissolved solid, a suspended solid, or a colloid. It is contemplated that the concentration of the transition metal oxide will be in the range of about 0.1 to about 1000 ppb based on the weight of the aqueous stream. Preferably, the first concentration of all the transition metal oxides in the aqueous stream will total less than about 500 ppb. It is preferred that the first concentration be reduced by about 90% by removing transition metal oxides through the use of the present method.

Contacting takes place in the separation zone. The separation zone is generally a condensate polishing unit. Optionally, the separation zone may include a prefilter.

Tubular and leaf prefilters are preferred, both of which may be employed with a cellulose filter aid. The dual morphology cation exchange resin of the present invention may be employed in conjunction with or in place of the cellulose filter aid. When present in a powdered form, the first particulate bed is a layer having a thickness in the range of about ⅛ to about ½ of an inch on the upstream side of the prefilter.

Alternatively, the dual morphology, cation exchange resin may be in bead form. In that case, it is preferred that the first particulate bed be in the range of about 30 to 48 inches in depth, preferably 36 inches. Such a "deep bed" is enclosed in a process vessel having inlet distributors and underdrains which provide for a substantially uniform plug flow through the bed with minimal disturbance of the resin particles. The process vessel may optionally be fitted with means to reverse the flow in the process vessel as, for example, during backflushing or chemical regeneration of the resin. Additionally, the process vessel may be fitted with means to transport the resin out of the separation zone for external resin regeneration or cleaning. Of course, the resin may be simply discarded after use or may be reloaded elsewhere for further use in some less demanding process application.

The first particulate bed is constituted by strongly acidic dual morphology cation exchange resin prepared by the sulfonation of a cross-linked copolymer, preferably a styrene-divinylbenzene copolymer. The active sites of the sulfuric acid cation exchange resin are negatively charged sulfonate groups which are capable of binding and exchanging cations. The dual morphology cation exchange resin of the present invention is contacted with the aqueous stream while the resin is in the hydrogen form.

The following example will illustrate the meaning of hydrogen form as applied to resins. Immobile ion exchange sites of a sulfonated cation exchange resin can include immobile anionic sulfonate radicals. If most of the anionic radicals were attached to mobile sodium cations, the resin would be in sodium form. Subsequently, a preponderance of the sodium cations might be exchanged for hydrogen ions, thus converting the resin into a hydrogen form.

In a presently contemplated and preferred form of the invention, the dual morphology resin is a resin manufactured by the Mitsubishi Kasei Corporation and commercially available under the tradename Diaion ™ PK 212L. The Diaion ™ PK 212L resin from Mitsubishi Kasei has been experimentally determined to be translucent in a desiccated state and opaque in a hydrated state. Mitsubishi Kasei literature describes the product as a sulfonic acid cation exchange resin with a styrene-divinylbenzene crosslinked matrix having an ultimate ion exchange capacity of about 1.5 to about 1.8 milliequivalents per cubic centimeter in the sodium form.

The Diaion ™ PK 212L resin is delivered by the manufacturer in sodium form and converted to hydrogen form for use in the present invention. The resin has a shipping density of about 773 grams per liter, a moisture content of about 52 to 58%, and an effective diameter of 0.61 mm.

The method for removing transition metal oxides in soluble cationic species may be practiced in a separation zone that contains more than one particulate bed. The aqueous stream may be contacted with anion exchange resin in a basic form, either before or after the aqueous stream containing condensate is passed to the first particulate bed. The anion exchange resin is a strong base resin, having quaternary ammonium functional groups or modified quaternary ammonium functional groups. The aqueous stream is contacted with the anion exchange resin while it is in a hydroxide form.

The method for removing transition metal oxides is advantageously conducted at predetermined space velocities in which the ratio of a dual morphology cation exchange resin space velocity to an anion exchange resin space velocity is prepared to coincide with the ratio of removable cations and anions which are expected to enter the condensate polishing unit with the aqueous stream. Ideally, this precaution avoids having one resin become exhausted before the other. Matching the ratio of resin space velocities with the ratio of removable cations to removable ions is especially important for mixed bed operation.

It is, therefore, preferred that the ratio of the dual morphology cation exchange resin space velocity to the anion exchange resin space velocity be maintained in the range of about 1:2 to about 3:1. The low end of the range is appropriate when it is anticipated that considerable amounts of sodium chloride may leak into the system and have to be removed. Similarly, additional anion resin serves to avoid premature silica breakthrough.

When powdered resin is applied in the separation section as a filter aid, the ratio of cation resin to anion resin in the precoat may be as high as 9:1 in condensate polishing units where the function of the cation resins is primarily the removal of metals alone. Typically, powdered resin filters are operated at flow rates of about 4 gallons per minute per square foot, with a resin layer approximately one quarter of an inch thick. A typical pressure loss through the filters is about 2 to about 5 psi when the resin is clean and about 25 to about 30 psi when the resin is loaded. Powdered resin, about 90% finer than 325 mesh, is applied on nylon cartridge elements. The precoat materials are not usually regenerated, but simply discarded after use.

The separation zone is operated at a pressure dictated by the pumping system that transfers the condensate from the condenser. The condensate pump discharge pressures may range from about 250 to 600 psi. Alternatively, the condensate polishing unit may be operated at a pressure as low as about 100 psi if a booster pump is provided downstream of the condensate polishing unit. Because high temperatures can damage ion exchange resins, the condensate polishing unit is rarely operated at a temperature of more than about 300° F.

At these pressures and temperatures, the aqueous stream is in a liquid state in the separation zone. The aqueous stream is contacted heterogeneously with a bed of solid bead resin particles. The resin particles have a particle size in the range of about 250 microns to about 1200 microns, as measured by a wet-sieve analysis performed upon the resin particles while they are in a hydrated state.

As a result of the contact between the aqueous stream and the resin particles, a purified stream is produced within the separation zone. The purified stream has a second concentration of the metal oxide, which is reduced in comparison to the first concentration. That is, a metal oxide present in a measurable concentration in the aqueous stream is removed by contact with the strongly acidic dual morphology cation exchange resin. The purified stream so produced may optionally be contacted with a second particulate bed including an exchange resin. The second particulate bed may include two or more types of resins which are arranged to be fluidized concurrently in the same process vessel as a single mixed bed.

Typical of the changes in physical properties which are observed upon hydrating the dual morphology cation exchange resin of the present invention are swelling, a decrease in apparent bulk density, an increase in pore diameter, and an increase in moisture content. Moisture content of the dual morphology cation exchange resin is in the range of about 45% to 65% by weight when fully hydrated.

The following example will serve to illustrate the method of the present invention.

EXAMPLE 1

A pilot plant for evaluating cation resins was designed and assembled on a test skid. It was installed at a nuclear generating station which had been in operation approximately 5 years. Typical iron particulate levels for condensate at the nuclear generating station are in the range of about 20 to about 25 parts per billion by weight.

Approximately 150 feet of 1½ inch carbon steel tubing carried condensate from the discharge side of primary condensate pumps to the pilot plant. Effluent water from the pilot plant was returned by similar piping to the suction side of the primary condensate pumps. Total flow through the pilot plant was about 4.0 gpm. Pilot plant inlet pressure was 145 psi.

The pilot plant contained four 2 inch diameter stainless steel resin test columns. Each of the test columns held 1,850 cubic centimeters of mixed resin in a resin bed having a depth of 3 feet. In addition to instrumentation for measuring flow, water conductivity, and pressure differential across the resin bed, each column contained a Millipore sampler with 0.45 micron membrane paper and Toray cation exchange paper which determined effluent condensate particulate and soluble metal levels. About 50 cubic centimeters per minute of sample flow was passed through the filters, with the filter papers being changed every 3 to 7 days. The filter papers were subsequently dissolved with a microwave digester and analyzed for metals using inductively coupled plasma techniques.

A bypass line with a similar sampler was installed to collect a sample of influent iron from the condensate.

Additionally, samples from the pilot plant inlet and the four resin column outlets were routed to a sequence controller installed on a resin test skid. The controller selected one sample at a time for analysis while routing the other three samples to disposal. The selected sample was analyzed first by an Anatel Model 100SE total organic analyzer, with a detection limit of 0.1 ppb. Then, the selected sample was passed through a General Electric Model 201 single channel ion chromatograph. By this dual analysis technique, inorganic and organic chlorides and sulfates in the condensate were measured at levels as low as 10 ppt.

The pilot plant did not contain provisions for resin cleaning or backwashing. In order to simulate as closely as possible the effects of normal plant operation, a transportable pilot-type ultrasonic resin cleaning system was obtained from Ultra Pure Water Technology. The pilot ultrasonic resin cleaning system sluiced the resin from a test column in the pilot plant, ultrasonically cleaned the resin, and returned it to the test column.

Figure 2:
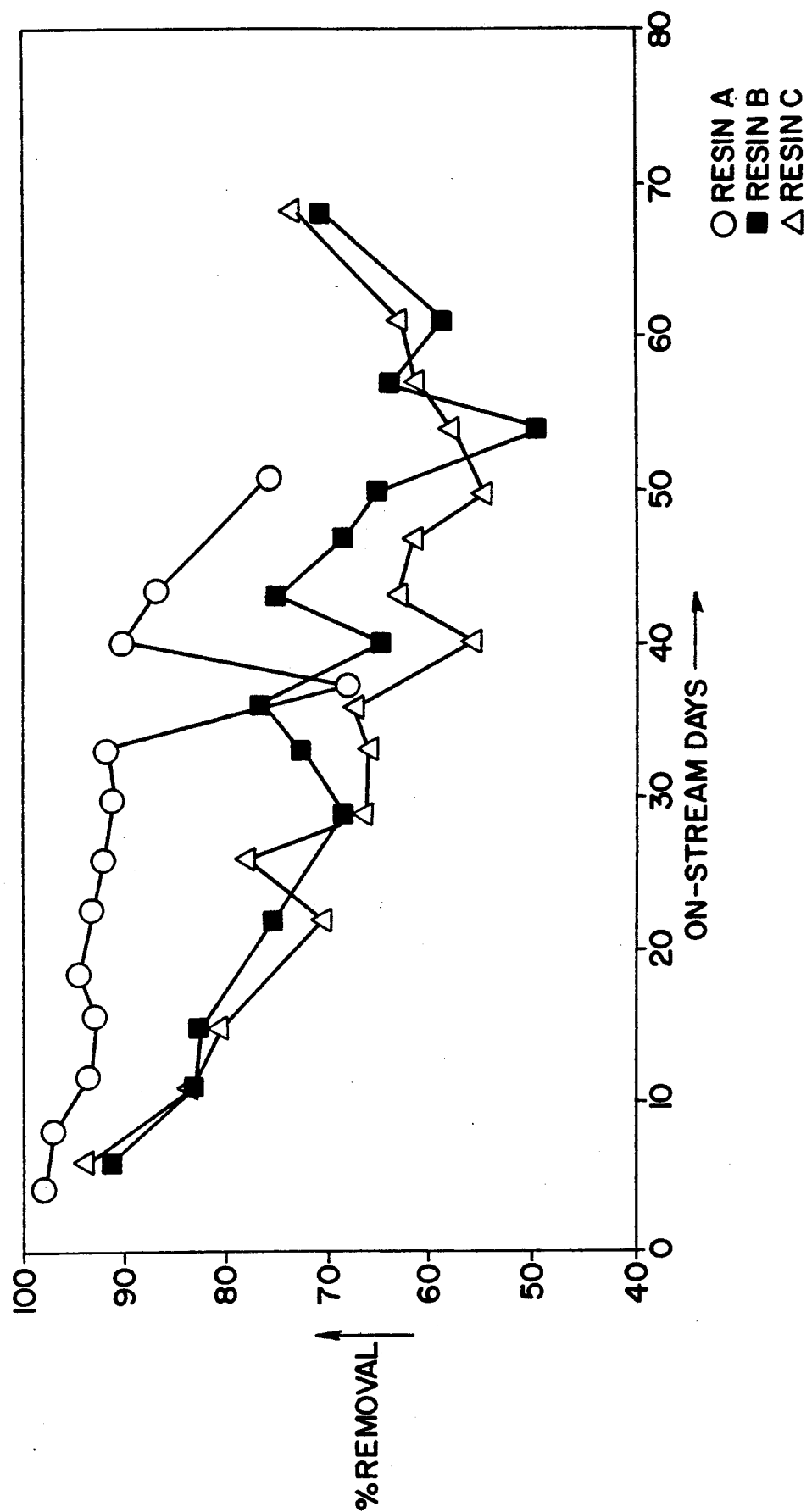
FIG. 2 is a graph showing the removal efficiency of three ion exchange resins as a function of onstream days for each resin.

The results of in-plant pilot testing for Resin A, Resin B, and Resin C are presented in FIGS. 1 through 3. Resin A is manufactured by the Mitsubishi Kasei Corporation under the trade name Diaion TM PK212. The Diaion TM PK 212L resin appeared translucent when dry but opaque when wet, as determined by visual examination. Resin B is manufactured by Rohm & Haas under the trade name IR-120. Resin B appeared translucent when dry and translucent when wet. Resin C is a commercially available resin produced by the Dow Company under the trade name Marathon C. Resin C also appeared translucent when dry and translucent when wet.

FIG. 1 shows the particulate iron removal efficiency of the three resins as a function of service days. Service days are days in which the pilot plant was in service processing condensate. Resin B and Resin C were commissioned together at service day "zero", and their removal efficiencies were first determined at approximately six service days. Resin A was commissioned and began processing condensate at approximately the eighteenth service day, with the first removal efficiency data point for Resin A being reported for the twenty-first service day.

It is important to distinguish service days which measure the time that the pilot plant processed condensate from onstream days which are measured differently for each of the resins. The onstream days represent the period of time during which a particular resin was processing condensate.

Referring now to FIG. 1, Resin B and Resin C initially exhibited removal efficiency of 90% or greater, but by the tenth service day had dropped into the range of about 80% removal. Thereafter, the performance of both Resin B and Resin C continued to deteriorate, falling below 70% removal efficiency by the fiftieth service day.

In contrast, Resin A demonstrated an initial removal efficiency of considerably more than 90% and continued to exhibit removal efficiencies in the range 90% or more through the fiftieth service day.

FIG. 2 presents the removal efficiencies of each resin as a function of the number of days that a particular resin was onstream. Viewed in the perspective of onstream days, it is apparent that Resin A performed at a higher initial iron particulate removal efficiency and demonstrated higher stability throughout its run.

FIG. 3 compares the resin crud loading of the three resins as a function of their onstream days. It can be seen that Resin A collected more iron particulate than did each of the other two resins during the thirty-eight days in which Resin A was onstream.

Taken together, the particulate iron removal efficiency and resin iron loading data demonstrate that Resin A, which is a resin that is translucent in a dry state and opaque in a hydrated state, outperformed Resin B and Resin C as an iron scavenging iron exchange resin for condensate. Particulate iron is not the only type of iron which the resin of the present invention will remove. The resin of the present invention does remove soluble iron species. However, particulate iron is the most damaging form of iron in condensate systems and is relatively susceptible to quantitative analyses. Resin B and Resin C, being translucent in both the desiccated state and the hydrated state, are not ion exchange resins according to the present invention.

The invention also provides a method for selecting an ion exchange resin for removing iron oxides from condensate. The method for selecting is useful for choosing between different types of sulfonic acid cation exchange resin. The method identifies cation exchange resins which have an enhanced capacity for iron oxides. A resin which is selected using the method need only be additionally tested for hydraulic stability and for leaching of soluble polystyrene sulfonates, before the resin can be confidently recommended for large pilot plant scale testing. The method obviates the need for trial and error testing of a large number of resins on a pilot plant scale by significantly narrowing the field of resins for further testing. The properties of hydraulic stability and leaching of polystyrene sulfonates can be readily evaluated in the laboratory.

The method includes providing particles of sulfonic cation exchange resin. "Particles" is a broad term intended to cover beads in the range of about 20 to about 40 mesh, granules in the range of about 60 to 200 mesh, and powders in the range of about 325 Tyler mesh. For more information concerning the Tyler mesh designation system, see Perry's Chemical Engineering Handbook, p. 21-15 (6th ed. 1984). Accordingly, the method can be used to screen resins for deep bed or prefilter precoat applications.

With the particles in a dry state, it is determined whether the particles are opaque or translucent. A dry state is a condition in which a resin contains 5% or less moisture content based on the dry weight of the resin. The determination is made with respect to light having wave lengths in the visible range. The determination is made after the particles have been pretreated to prepare for characterization, using the procedure described above.

The resin is determined to be opaque if substantially no visible light can pass through the particle. The particle is translucent or transparent if an appreciable amount of light is able to pass through solid particles. Preferably, this determination is accomplished by visually examining the particles. A microscope may be used as an aid in the visual examination.

The unique sulfonated styrene-divinylbenzene cation exchange resins having an enhanced capacity for the iron oxides present in BWR condensates can be described independently by two different criteria. One criteria is optical appearance and the other is a physico-chemical criteria.

The unique cation exchange resins are opaque in appearance when fully hydrated and translucent to transparent when desiccated. Additionally, the unique cation exchange resins are macroreticular when fully hydrated and microreticular when desiccated. The term macroreticular is synonymous with the term macroporous. The term macroreticular is synonymous with the terms microporous and gel-type. For the purpose of this invention, the terms opaque, translucent and transparent are defined as follows:

Opaque—The opaque structure does not permit passage of ordinary light or permit ordinary objects to be seen through the opaque structure.

Translucent—The translucent structure permits passage of ordinary light but does not permit objects to be seen through the translucent structure.

Transparent—The transparent structure permits the passage of ordinary light and permits objects to be seen through the transparent structure.

The physico-chemical structure of the unique cation exchange resins may be defined by a combination of total moisture holding capacity and surface area. For the purpose of this invention, the limits consistent with the unique products having the enhanced capacity for the iron oxides are as follows:

Total Moisture Holding Capacity, % wt.—45 to 65%
Surface Area, $m^2/g$—7 to 60

The optical appearance of the ion exchange resin beads in the fully hydrated and desiccated states in vials may be observed visually in a strong light. The appearance of the ion exchange resin beads may also be observed microscopically at a magnification of about 20× using transmitted light. The beads, wet or dry, are placed on a glass slide with grid marks so as to observe the passage or non-passage of light and the observance or lack of observance of the grid marks through the beads.

The methods for the examination of the macroreticular and microreticular beads are described in the following references which are herein incorporated by reference:

1. AMBER-HI-LITES, No. 161, Spring, 1979. Publication of Rohm and Haas Company, Phila., Pa.
2. Kun, Ken and Kunin, R., J. Polym. Sci., Part A-1, Vol. 6, 2689 (1968).
3. Brunauer, S., Emmett, P., and Teller, E., J. Amer. Chem. Soc. 60, 309 (1938).

The term surface area or specific surface (square meters/gram) refers to the apparent surface of the boundary of the particle itself as well as the surface area of the accessible pores of the entire particle. Since the microreticular ion exchange resin beads have essentially no pore structure, the surface areas of these particles are low and depend upon particle size. Hence commercial microreticular ion exchange beads have surface areas less than 0.1 square meters/gram. Most macroreticular ion exchange beads of the same particle size have surface areas in the 5-200 square meters/gram range.

A similar determination is also made with the particles in a hydrated state. The hydrated state is one in which the particles contain about 95% or more of their fully hydrated moisture content. This determination is also preferably performed by visually examining the particles. Both the determining in the dry state and determining in the hydrated state are accomplished with the particles of resin in hydrogen form.

Dual morphology particles are defined as those which are translucent in a dry state and opaque in a hydrated state. The dual morphology particles are selected for use in removing iron oxides from condensate, where it is probable that they will exhibit enhanced iron oxide removal, as compared to sulfonic acid cation exchange resin particles which do not exhibit dual morphology. One need only perform laboratory scale tests for hydraulic stability and for possible leaching of soluble polystyrene sulfonates on dual morphology catalyst selected according to the present invention before proceeding to large pilot plant experimentation with the selected resins.

The method for selecting resins is a significant advance in the technology of iron oxide removal by ion exchange resins because the normal methods for measuring surface area are restricted to resins under completely dry and evacuated conditions. The results of this dry resin surface area testing can be misleading because many cation exchange resins lose surface area when they are dried.

Without wishing to be bound by theory, the following hypothesis is advanced as a tentative explanation of how the method for selecting resins is able to produce surprisingly useful results. Even though wet surface area and wet pore volume cannot be directly measured, it is likely that resins possessing both high surface area and a high pore volume in the hydrated state possess a relatively enhanced capacity for removing iron oxide from an aqueous stream. The problem lies in identifying the most suitable resins without resorting to large scale pilot plant test programs.

It is hypothesized that the method for selecting identifies resins which are essentially gelular in the desiccated state, as indicated by translucency to visual range light, but which have a sufficiently low degree of cross-linking to undergo significant swelling on contact with water. In theory, the resins selected are those which may swell to such an extent that pores having diameters much larger than the molecular scale are formed. The large pores having diameters greater than 30 Å may possibly interfere with the transmission of visible light through the resin and cause the hydrated resin to be opaque to visible range light.

The invention additionally provides a method of removing amorphous iron oxide from condensate. Earlier researchers have identified amorphous iron oxide as the most difficult form of iron oxide to remove from condensate. The amorphous iron oxide is not a simple ionic species. It is usually a colloid whose charge varies with process conditions. Under the conditions of BWR operation, the charge on the colloid iron oxide is positive and the iron oxide can be adsorbed by the cation exchange resin. As the crystalline and ionic forms of iron oxide compounds are relatively easy to remove, the most efficient methods of removing iron oxide are those which are effective with amorphous iron oxide.

In the method, amorphous iron oxide is adsorbed on a strong acid cation exchange resin. The resin includes a resin matrix which is defined as a molecular network of an ion exchange resin which carries fixed ions. The fixed ions are those non-exchangeable ions and ionogenic groups in ion exchanger resin which have a charge opposite to that of mobile exchangeable ions. The resin also includes an adsorbent surface which generally surrounds the resin matrix defining both an external boundary surface for the resin and an internal surface. The internal surface delineates relatively large pores which are not a part of the resin matrix gel structure. The amorphous iron oxide is adsorbed on the adsorbent surface to produce adsorbed iron oxide which is relatively immobile.

The adsorbed iron oxide is dissociated to iron-containing ions. Dissociation occurs at the adsorbent surface where active sites apparently create localized regions of pH which are below an isoelectric point for hydrous iron oxides. Adsorption and dissolution can only occur if active sites at the adsorbent surface are in hydrogen form, providing the necessary acidity to cause dissolution of the hydrous iron oxides.

After dissociating into iron-containing ions, the iron-containing ions at the adsorbent surface diffuse into the resin matrix, leaving the active sites at the adsorbent surface free to adsorb and dissociate more of the amorphous iron oxide. In order to keep the relative rates of adsorption, dissociation, and diffusion in balance, and so maximize the removal of amorphous iron oxide from condensate, it is necessary that the strong acid cation exchange resin employed be gelular in a dry state and substantially macroreticular in a hydrated state.

It is especially preferred that the strong acid cation exchange resin which is gelular in a dry state and substantially macroreticular in a hydrated state be a resin manufactured by Mitsubishi Kasei Corporation under the trade name PK 212L. The resin Diaion TM PK 212L is a sulfonic resin having a styrene-divinylbenzene cross-linked matrix. The resin is obtained in the sodium form and converted to the hydrogen form for use in the present invention.

The method of removing amorphous iron oxide may be applied utilizing a resin in a powdered form. Preferably, the powdered form resin has a size distribution such that in the range of about 90% or more of the resin can pass through a 325 mesh screen, according to the Tyler mesh system. The resin is applied as a layer on an upstream side of a filter through which a condensate stream is passed. The layer is preferably in the range of about one-eighth to about one-half of an inch thick, and typical flow rates through the filter are about 4 gallons per minute per square foot of filter surface.

Preferably, the resin is in a bead form having a Tyler mesh size in the range of about 20 to about 40. It is recommended that the resin in the bead form be arranged in a bed having a depth of about 20 to about 24 inches through which the condensate stream is passed.

It is necessary that the resin be gelular in a dry state and substantially macroreticular in a hydrated state. Otherwise, the adsorbing, dissociating, and diffusing steps would not remain in balance and the method would not continue to operate with an enhanced removal efficiency. It is contemplated that the resin will normally be in the dry state at the end of a process accomplishing manufacture of the resin and that the resin will be converted from a gelular morphology to a macroreticular morphology by contacting the resin with water at an industrial site shortly before commercial use.

Although particular embodiments of the present invention have been described for the purpose of clarity, it is not intended that the invention be limited to the described embodiments. The scope of the invention is intended to be as broad as the claims will allow. Further, although certain theories have been advanced as possible explanations for the surprisingly effectiveness of the present invention, the invention is not limited to and does not stand or fall with the theories. The invention, when practiced as described, represents a significant advance in the technology of transition metal oxide removal by ion exchange resin.

What is claimed is:

1. A method for removing transition metal oxides and soluble cationic species from condensate comprising:

hydrating a strongly acidic dual morphology cation exchange resin in a microreticular, desiccated morphology to convert said dual morphology cation exchange resin to a macroreticular, hydrated morphology;

said dual morphology cation exchange resin being gelular in a dry state and substantially macroreticular in a hydrated state; and passing an aqueous stream containing condensate which has a first concentration of a transition metal oxide into a separation zone that includes a first particulate bed constituted by said dual morphology cation exchange resin in a macroreticular, hydrated morphology and in a hydrogen form.

2. The method according to claim 1 which further comprises contacting the aqueous stream with an anion exchange resin in a hydroxide form.

3. The method of claim 2 which further comprises contacting the aqueous stream with the dual morphology cation exchange resin and with the anion exchange resin at predetermined space velocities, in which the ratio of a dual morphology cation exchange resin space velocity to an anion exchange resin space velocity is in the range of about 1:2 to about 3:1.

4. The method of claim 2 which further comprises producing in the separation zone a purified stream having a second concentration of the transition metal oxide, reduced in comparison to said first concentration, and
contacting the purified stream with a second particular bed including an ion exchange resin.

5. The method of claim 2 wherein the aqueous stream is contacted with said dual morphology cation exchange resin and said anion exchange resin in the first particulate bed as a mixed bed process.

6. The method of claim 1 wherein the contacting of the aqueous stream with the dual morphology cation exchange resin is heterogeneous contacting between the aqueous stream and a multitude of resin particles, each of the resin particles having a particle size in the range of about 200 microns to about 1200 microns.

7. The method of claim 1 which further comprises converting the dual morphology cation exchange resin from a sodium form to the hydrogen form with a simultaneous swelling of the dual morphology cation exchange resin in the range of about 5% to about 12% by volume.

8. The method of claim 7 wherein the swelling simultaneous with conversion to the hydrogen form is in the range of about 5% to about 10% by volume.

9. The method of claim 1 wherein the hydrating of the dual morphology cation exchange resin increases the moisture content of said dual morphology cation exchange resin to the range of about 45% to about 65% by weight.

10. The method of claim 9 wherein the dry surface area of the dual morphology cation exchange resin is in the range of about 7 to about 60 square meters per gram.

11. A method of removing amorphous iron oxide from condensate, which comprises:
adsorbing the amorphous iron oxide on a strong acid cation exchange resin having a resin matrix and an adsorbent surface surrounding the resin matrix to produce adsorbed iron oxide, said resin being gelular in dry state and substantially macroreticular in a hydrated state;
dissociating the adsorbed iron oxide into iron-containing ions at the adsorbent surface of the resin; and
diffusing the iron-containing ions into the resin matrix.

12. The method of claim 11 wherein the resin is in a powdered form and disposed as a layer on an upstream side of a filter element exposed to a condensate stream.

13. The method of claim 11 wherein the resin is in a bead form and constitutes a bed having a depth in the range of about 24 to about 48 inches through which the condensate stream is passed.

14. The method of claim 11 further comprising converting the resin to a macroreticular morphology by contacting the resin with water.

15. The method of claim 11 wherein the resin has a moisture content in the fully hydrated state in the range of about 45% to 65% by weight and a surface area in the dry state in the range of about 7 to about 60 square meters per gram.

* * * * *